United States Patent
Zhou et al.

(10) Patent No.: US 9,614,372 B2
(45) Date of Patent: Apr. 4, 2017

(54) ADAPTIVE POWER SWITCH CIRCUIT

(71) Applicant: ASUSTeK COMPUTER INC., Taipei (TW)

(72) Inventors: Xiao-Feng Zhou, Taipei (TW); Ching-Ji Liang, Taipei (TW)

(73) Assignee: ASUSTeK COMPUTER INC., Taipei (TW)

( * ) Notice: Subject to any disclaimer, the term of this patent is extended or adjusted under 35 U.S.C. 154(b) by 447 days.

(21) Appl. No.: 14/279,341

(22) Filed: May 16, 2014

(65) Prior Publication Data

US 2014/0359329 A1    Dec. 4, 2014

(30) Foreign Application Priority Data

May 30, 2013 (CN) .......................... 2013 1 0209352

(51) Int. Cl.
| | |
|---|---|
| *G06F 1/32* | (2006.01) |
| *H02J 1/02* | (2006.01) |
| *H02M 1/088* | (2006.01) |
| *H02M 3/158* | (2006.01) |
| *H02M 1/00* | (2006.01) |

(52) U.S. Cl.
CPC .............. *H02J 1/02* (2013.01); *H02M 1/088* (2013.01); *H02M 3/158* (2013.01); *H02M 3/1588* (2013.01); *H02M 2001/0032* (2013.01); *Y02B 70/1466* (2013.01); *Y02B 70/16* (2013.01)

(58) Field of Classification Search
None
See application file for complete search history.

(56) References Cited

U.S. PATENT DOCUMENTS

| | | | |
|---|---|---|---|
| 6,778,001 B2 | 8/2004 | Mayama et al. | |
| 2010/0102642 A1 | 4/2010 | Odaohhara et al. | |
| 2011/0153111 A1* | 6/2011 | Doh ........................ | H02J 9/005 |
| | | | 700/296 |
| 2012/0146600 A1* | 6/2012 | Xu ........................... | H02M 1/32 |
| | | | 323/271 |
| 2012/0236613 A1* | 9/2012 | Chen ........................ | G06F 1/26 |
| | | | 363/126 |

FOREIGN PATENT DOCUMENTS

| | | |
|---|---|---|
| CN | 101335488 | 12/2008 |
| CN | 201805361 | 4/2011 |
| CN | 102097924 A | 6/2011 |
| CN | 102480228 A | 5/2012 |
| CN | 102570793 A | 7/2012 |
| CN | 102891599 A | 1/2013 |

* cited by examiner

*Primary Examiner* — Jared Fureman
*Assistant Examiner* — Aqeel Bukhari
(74) *Attorney, Agent, or Firm* — CKC & Partners Co., Ltd.

(57) ABSTRACT

An adaptive power-switch circuit suitable for an electronic device includes a multi-gate power switch module, a monitoring module and a driving controller circuit. The multi-gate power switch module includes to plurality of power switch units connected in parallel. The power switch units include a gate control terminal respectively. The monitoring module is used to monitor an operating load of the electronic device. The driving control circuit is coupled to the monitoring module to selectively disable the gate controlling terminals to form a plurality of configurations. The driving control circuit selects one of the configurations to operate the multi-gate power switch module according to the operating load.

9 Claims, 3 Drawing Sheets

ADAPTIVE POWER SWITCH CIRCUIT

CROSS-REFERENCE TO RELATED APPLICATION

This application claims the priority benefit of CN application serial no. 201310209352.3, filed on May 30, 2013. The entirety of the above-mentioned patent application is hereby incorporated via reference herein and made a part of specification.

BACKGROUND OF THE INVENTION

Field of the Invention

This disclosure relates to a power switch and, more particularly to a power switch used in an electronic device.

Description of the Related Art

A DC-DC switching power supply is commonly used in an electronic device to provide power to load circuits in the electronic device. The DC-DC switching power supply includes various power switches such as a metal oxide semiconductor field effect transistor (MOSFET) cell. The various power switches have different features and are suitable for different situations.

For example, the power switch with larger channel area usually has lower conducting resistance and loss of conduction, the power switch is suitable for heavy loads. However, larger channel area of power switch simultaneously has higher gate capacitance Qg which generates high driving loss in operation.

When the DC-DC switching power supply drives a light load, the conducting loss is low, and the driving loss becomes more significant. Thus the power switch of high gate capacitance makes the DC-DC switching power supply have poor efficiency in light load due to the loss of the gate capacitor.

Furthermore, the power switch with the lower channel area usually has larger conducting resistance $R_{DS(ON)}$ which generates high conducting loss and is unsuitable for driving the heavy load. Contrarily, the power switch of smaller channel area has lower gate capacitance Qg and thus the driving loss is low. While operating in the light load, the conducting loss is low and the driving loss is relative important. Thus the power switch of lower gate capacitance has better efficiency.

BRIEF SUMMARY OF THE INVENTION

An adaptive power switch circuit in an electronic device is provided. The adaptive power switch circuit includes a multi-gate power switch module, a monitoring module and a driving control circuit. The multi-gate power switch module includes a plurality of gate control terminals and a plurality of power switch units. The power switch unit includes a drain terminal, a source terminal and one of the gate control terminals. The drain terminals of the power switch units are connected to each other, and the source terminals of the power switch units are connected to each other.

The monitoring module is used to monitor the operating load of the electronic device. The driving control circuit is coupled to the monitoring module to selectively disable the gate control terminals, and a plurality of configurations is formed. The driving control circuit chooses a configuration according to the operating load to operate the multi-gate power switch module.

Consequently, various configurations can be formed by disabling a part of the gate control terminals dynamically, and the switching frequency of the switches can be adjusted dynamically under same or different configurations. By using the two adjusting method (changing the configuration and changing the frequency of switching switches) alternately, the adaptive adjustment mechanism of the multi-gate power switch module is formed.

DETAILED DESCRIPTION OF THE EMBODIMENTS

Figure 1:
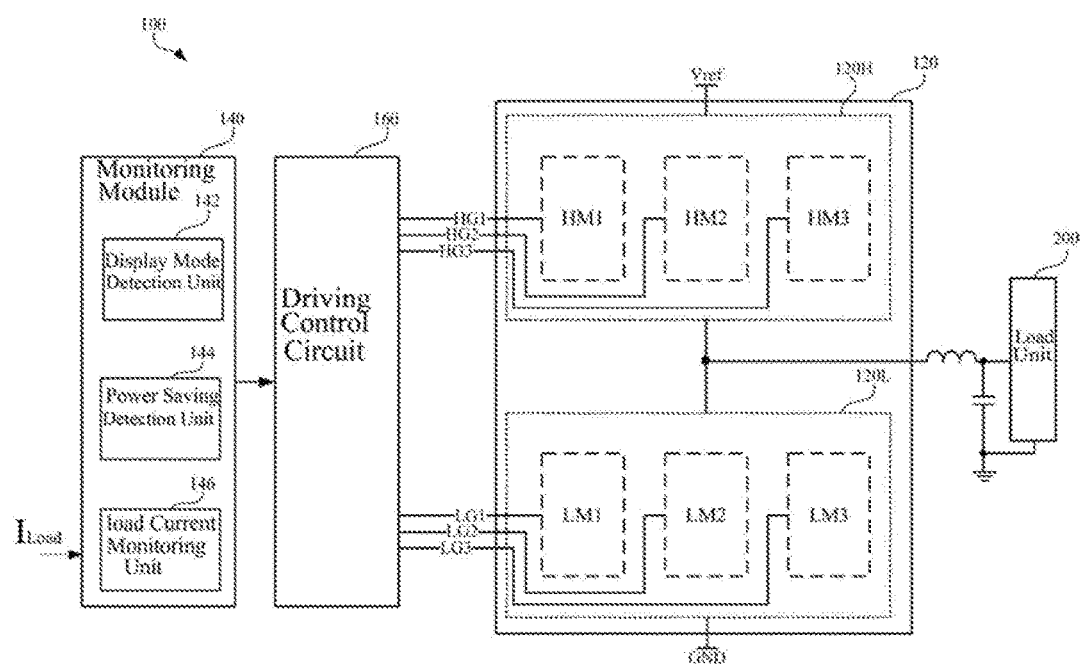
FIG. 1 shows an adaptive power switch circuit in one embodiment.

As shown in FIG. 1, FIG. 1 shows an adaptive power switch circuit 100 in one embodiment. In this embodiment, the adaptive power switch circuit 100 is used in an electronic device (not shown) to provide the power to the load unit 200.

The adaptive power switch circuit 100 includes a multi-gate power switch module 120, a monitoring module 140 and a driving control circuit 160. The multi-gate power switch module 120 is used to adjust the power needed by the electronic device.

The multi-gate power switch module 120 includes a high side switch 120H and a low side switch 120L. One end of the high side switch 120H is coupled to system reference voltage Vref, and one end of the low side switch 120L is coupled to the system ground terminal GND. The other end of the high side switch 120H is coupled to the other end of the low side switch 120L, and further connected to a load unit 200 at the output terminal.

The high side switch 120H and the low side switch 120L of the multi-gate power switch module 120 includes K power switching units and K gate control terminals, respectively, and K is positive integer more than 2. The driving control circuit 160 selectively disables D gate control terminals of the K gate control terminals according to the operating load, wherein D is positive integer and $0 \le D \le (K-1)$.

In this embodiment, K is 3 as an example. The high side switch 120H and the low side switch 120L respectively includes three power switch units, which is not limited herein. As shown in FIG. 1, the high side switch 120H and the low side switch 120L respectively includes three power switching units HM1, HM2, HM3, and LM1, LM2 and LM3. The power switch unit may be a metal oxide semiconductor field effect transistor (MOSFET) cell.

Figure 2:
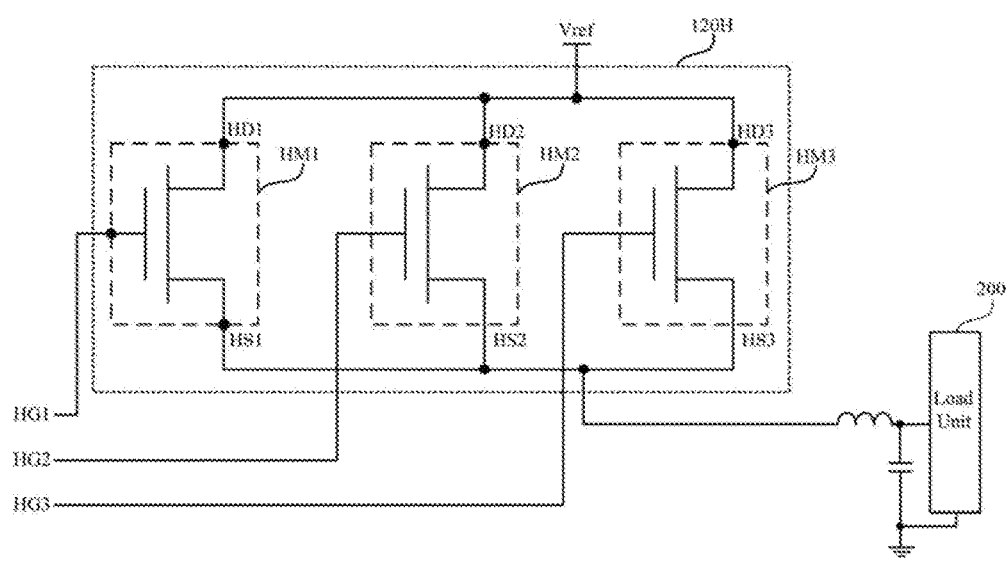
FIG. 2 is a schematic diagram shows a power switch unit an high side switch of the power switch circuit in FIG. 1.

FIG. 2 is a schematic diagram showing the power switch units HM1, HM2 and HM3 of the high side switch 120H in FIG. 1. As shown in FIG. 2, the power switch units HM1, HM2 and HM3 respectively includes a drain terminal, a source terminal and a gate control terminal.

The power switch units HM1, HM2 and HM3 of the high side switch 120H are connected in parallel, and the power switch units HM1, HM2 and HM3 includes three gate control terminals HG1, HG2 and HG3 that can be operated independently.

That is, the high side switch 120H of the multi-gate power switch module 120 includes multiple gate control terminals HG1, HG2 and HG3 which can be operated independently.

The power switch units LM1, LM2, LM3 of the low side switch 120L of the multi-gate power switch module 120 can be connected in parallel and include gate control terminals LG1, LG2 and LG3 that can be operated independently. The operation of the high side switch 120H is similar to that of the low side switch 120L, the difference between the high side switch 120H and the low side switch 120L is that the switching states of the high side switch 120H and the low side switch 120L are mutually exclusive. That is, when the high side switch 120H is turned on the low side switch 120L is turned off. The high side switch 120H is illustrated hereinafter, and the low side switch 120L can be analogized.

In general, the power switch units of different specification (such as MOSFET cell) are applicable to drive different loads.

For example, the power switch unit of wider channel width usually has lower conducting resistance $R_{DS(ON)}$ and higher gate capacitance Qg, that is, the power switch unit of lower conducting loss and higher driving loss is applicable to output power to drive heavy load.

Furthermore, the power switch unit of narrower channel width usually has larger conducting resistance $R_{DS(ON)}$ and lower gate capacitance Qg, that is, the power switch unit has larger conducting loss and lower driving loss, and it is applicable to output power to drive the light load.

That is, since the characteristics of vary power switches are different, a single power switch cannot have best efficiency in both the states of heavy load and light load.

As shown in FIG. 1, in this embodiment, the multi-gate power switch module 120 adjusts the power switch dynamically according to the operating load.

The monitoring module 140 is used to monitor the operating load of the electronic device. The driving control circuit 160 is coupled to the monitoring module 140. The driving control circuit 160 selectively enables all or disables part of the gate control terminals HG1, HG2, HG3, LG1, LG2 and LG3 of the multi-gate power switch module 120 according to the operating load. The multi-gate power switch module 120 is controlled by the enabled gate control terminals.

The multi-gate power switch module 120 is adjusted by adjusting the number of the disabled gate control terminals to correspond to the operating load (such as the heavy load, medium load and light load). In this embodiment, the driving control circuit 160 can adjust the conducting resistance $R_{DS(ON)}$ and the gate capacitance Qg of the multi-gate power switch module 120.

The monitoring module 140 may include a display mode detection unit 142 and a power saving mode detection unit 144. The display mode detection unit 142 is used to detect that the display mode of the electronic device is a three dimensional mode or a two dimensional mode. The low power mode detection unit 144 is used to detect whether the electronic device is switched to a low power mode (LPM).

In this embodiment, if the display mode detection unit 142 detects that the display mode is the three dimensional mode (that is the heavy load mode), the monitoring module 140 can determine that the operating mode is heavy load mode. At this moment, the driving control circuit 160 enables all gate control terminals HG2 and HG3 of the high side switch 120H, the multi-gate power switch module 120 can operate via all of the power switch units HM1, HM2 and HM3 of the high side switch 120H. The power switch units HM1 HM2, HM3 are connected in parallel and operated simultaneously, the three switch units forms a large power switch of wide channel width, and the power switch units HM1, HM2, HM3 have lower conducting resistance $R_{DS(ON)}$ and excellent efficiency at heavy load.

The low side switch 120L and the high side switch 120H are mutually exclusive in operation, when the power switch units HM1, HM2 and HM3 of the high side switch 120H are turned on, the power switch units LM1, LM2 and LM3 of the low side switch 120L, are turned off, and vice versa.

If the electronic device switches the display mode from the three dimensional mode to the second dimensional mode, a processing module or a display interface (not shown) of the electronic device transmits a three dimensional to a two dimensional switching signal $S_{3D/2D}$ to the display mode detection unit 142, the display mode detection unit 142 determines that the display mode is a two dimensional mode. The monitoring module 140 can determine that the operating load is in the medium load mode. The driving control circuit 160 disables all of the gate control terminals HG3 and LG3 and enables the gate control terminals HG1, HG2, LG1 and LG2. The multi-gate power switch module 120 can be operated via partial power switch units HM1, HM2, LM1 and LM2.

If the processing module or a power manager (not shown) of the electronic device sends out a trigger signal $S_{LPM}$ of LPM, the low power mode detection unit 144 detects that the electronic device is switched to the low power mode. The monitoring module 140 determines that the operating mode is the light load, mode. The driving control circuit 160 disables the gate control terminal HG2, HG3, LG2 and LG3 and only enables the gate control terminal HG1 and LG1. The multi-gate power switch module 120 operates via partial power switch units HM1 and LM1.

Since partial power switch units are disabled, only partial enabled power switch units of the multi-gate power switch module 120 operates, which is equivalent to form a power switch unit of smaller area, and thus the gate capacitance Qg and the driving loss are low.

The driving control circuit 160 can form three different configurations according to different operating loads (such as the heavy load, the medium load, or the light load).

Furthermore, the method of the monitoring module 140 determining the three dimensional mode, the two dimensional mode and the low power mode is not limited only according to the heavy load, the medium load and the light load. The monitoring module 140 may further includes a load current monitoring unit 146, the load current monitoring unit 146 is used to detect the load current $I_{Load}$, the monitoring module 140 can combine the three dimensional mode, the two dimensional mode and the low power mode with the load current detected by the load current monitoring unit 146 to get more various results.

In the above embodiment, the high side switch 120H and the low side switch 120L of the multi-gate power switch module 120 includes three power switch units respectively, which is not limited herein.

When the display mode is the three dimensional mode, the driving control circuit 160 disables X game control terminals of the K gate control terminals. When the display mode is the two dimensional mode, the driving control circuit 160 disables Y gate control terminals of the K gate control terminals. When the electronic device is switched to the low power mode, the driving control circuit 160 disables Z gate control terminals of the K gate control terminals. Wherein, $0 \leq X \leq Y \leq Z \leq (K-1)$, and X, Y and Z are positive integers.

Additionally, the multi-gate power switch module 120 can adjust the conducting resistance or the different gate capacitances by disabling the gate control terminals according to different configuration conditions.

The power switch units HM1, HM2, HM3, LM1, LM2 and LM3 of the multi gate power switch module 120 may further have different conducting resistances and different gate capacitances to make the adjusting, range wider. For example, the power switch units HM1, HM2, HM3, LM1, LM2 and LM3 have different conducting width and conducting length, respectively.

For example, the power switch units HM1 and LM1 have lower conducting resistance or higher gate capacitance compared with other power switch units HM2, HM3, LM2 and LM3, the power switch units HM3 and LM3 have higher conducting consistence lower gate capacitance compared with other power switch units HM1, HM2, LM1 and LM2, which is not limited herein.

Figure 3:
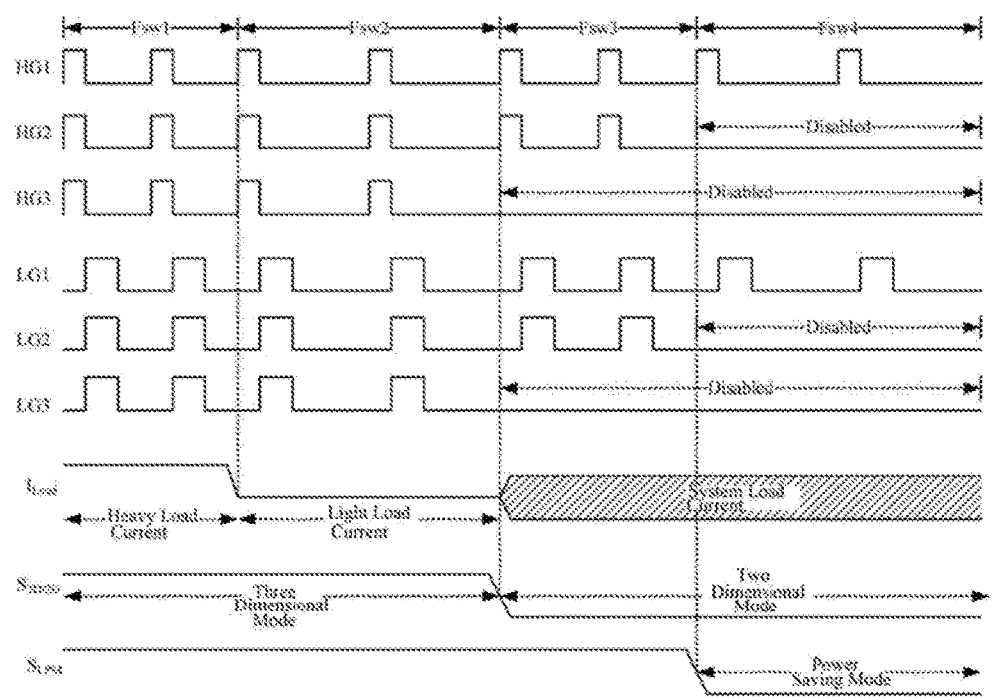
FIG. 3 is a signal sequence diagram showing that a driving control circuit controls a multi-gate power switch module according to different switch switching frequencies in one embodiment.

In one embodiment, the driving control circuit 160 also can control the multi-gate power switch module 120 according to different switching frequencies of the switches to correspond to different operating loads. FIG. 3 is a signal sequence diagram showing that the driving control circuit 160 operates the multi-gate power switch module 120 according to different switching frequencies (such as Fsw1 to Fsw4) of switches.

As shown in FIG. 3, when the display mode is the three dimensional mode and not switched to the low power mode, and the load current monitoring unit 146 detects that the load current is the heavy load current, the driving control circuit 160 can use a first switching frequency Fsw1.

When the display mode is the three dimensional mode and not switched to the low power mode, and the load current monitoring unit 146 detects the load current is the light load current, the driving control circuit 160 uses a second switching frequency Fsw2 of the switch (the second switching, frequency Fsw2 is lower than the first switching frequency Fsw1). That is in the same configuration (at this moment, no switch is disabled), the switching frequency can be adjusted (such as the first switching frequency Fsw1 and the second switching frequency Fsw2) to correspond to different load current.

Furthermore, in different modes (for example, when the display mode is the two dimensional mode and the electronic device is switched to the low power mode), different third switching frequencies Fsw3 and different fourth switching frequencies Fsw4 may be used.

When the display mode is the two dimensional mode (the gate control terminals HG3 and LG3 are disabled), as shown in FIG. 3, the third switching frequency Fsw3 is used to control the multi-gate power switch module 120. In one embodiment, the third switching frequency Fsw3 in the two dimensional mode can be adjusted dynamically (not shown) to correspond to different loads. The adjusting method of the third switching frequency Fsw3 is similar to that of the first switching frequency Fsw1 and the second switching, frequency Fsw2 in same configurations (the gate control terminal HG3 and LG3 are disabled) stated above, which is omitted herein.

Furthermore, when the electronic device is switched to the low power mode (the gate control terminal HG2, HG3, LG2, LG3 are disabled), the consent fourth switching frequency Fsw4 is used to control the multi-gate power switch module 120. In one embodiment, when the electronic device is switched to the low power mode (in the same configuration, the gate control terminal HG2, HG3, LG2 and LG3 are disabled), the fourth switching frequency Fsw4 can be adjusted dynamically (not shown) corresponding, to different loads.

Additionally, the monitoring module 140 and the driving control circuit 160 can be disposed in a pulse width modulation integrated circuit (PWMIC) and a driver integrated circuit to be used cooperating with the multi-gate power switch module 120. Moreover, the monitoring module 140, the driving control 160 and the multi-gate power switch module 120 also may be integrated in a single DC-DC converter.

Although the present disclosure has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An adaptive power switch circuit for an electronic device, comprising:
    a multi-gate power switch module, wherein the multi-gate power switch module includes an high side switch and a low side switch, the high side switch and the low side switch include K power switch units and K gate control terminals, respectively, the driving control circuit selectively disables D gate control terminals of the K gate control terminals according to the operating load, $0 \leq D \leq (K-1)$ and K is a positive integer more than 2;
    a monitoring module used to monitor an operating load of the electronic device;
    a driving control circuit coupled to the monitoring module and the multi-gate power switch module to selectively disable the gate control terminals to form a plurality of configurations, wherein the driving control circuit selects one of the configurations according to the operating load to operate the multi-gate power switch module.

2. The adaptive power switch circuit according to claim 1, wherein when the driving control circuit selects one of the configurations, the driving control circuit operates the multi-gate power switch module with a first switch switching frequency and a second switch switching frequency according to the operating load.

3. The adaptive power switch circuit according to claim 1, wherein when the driving control circuit uses different configurations, the driving control circuit further operates the multi-gate power switch module with the first switch switching frequency and the second switch switching frequency, and the first switch switching frequency and the second switch switching frequency are different.

4. The adaptive power switch circuit according to claim 1, wherein the power switch units further include different conducting resistances and different gate capacitances.

5. The adaptive power switch circuit according to 1, wherein the monitoring module includes:
    a display mode detection unit used to detect that a display mode of the electronic device is a three dimensional mode or a two dimensional mode.

6. The adaptive power switch circuit according to claim 5, wherein the monitoring module includes:
    a low power mode detection unit used to detect whether the electronic device is switched to a low power mode.

7. The adaptive power switch circuit according to claim 6, wherein when the display mode is the three dimensional mode, the driving control circuit disables X gate control terminals of the K gate control terminals;

when the display mode is the two dimensional mode, the driving control circuit disables Y gate control terminals of the K gate control terminals; and when the electronic device is switched to the low power mode, the driving control circuit disables Z gate control terminals of the K gate control terminals, and $0 \leq X \leq Y \leq Z \leq (K-1)$.

8. The adaptive power switch circuit according to claim 6, wherein the monitoring module further includes:

a load current monitoring unit used to detect a load current of the electronic device, the driving control circuit operates the multi-gate power switch module with a first switch switching frequency and a second switch switching frequency according to the load current.

9. The adaptive power switch circuit according to claim 1, wherein each power switch unit includes one of a drain terminal, a source terminal and one of the gate control terminals, the drain terminals of the power switch units are connected to each other, and the source terminals of the power switch units are connected to each other.

* * * * *